(12) United States Patent
Davies et al.

(10) Patent No.: US 6,789,661 B2
(45) Date of Patent: Sep. 14, 2004

(54) INLINE FEEDER

(76) Inventors: Jeff Davies, 10 Hearnstead Drive, Unit 5, Hamilton, Ontario (CA), L8W 2E7; Paul Davies, 10 Hearnstead Drive, Unit 5, Hamilton, Ontario (CA), L8W 2E7

( * ) Notice: Subject to any disclaimer, the term of this patent is extended or adjusted under 35 U.S.C. 154(b) by 29 days.

(21) Appl. No.: 10/277,996

(22) Filed: Oct. 23, 2002

(65) Prior Publication Data

US 2003/0080139 A1 May 1, 2003

Related U.S. Application Data

(60) Provisional application No. 60/330,607, filed on Oct. 25, 2001.

(51) Int. Cl.[7] .............................................. B65G 47/24
(52) U.S. Cl. ...................................... 198/391; 198/444
(58) Field of Search ................................. 198/380, 391, 198/395, 444

(56) References Cited

U.S. PATENT DOCUMENTS

| | | | |
|---|---|---|---|
| 3,295,661 A | * 1/1967 | Mitchell, Jr. et al. | ....... 198/391 |
| 4,641,741 A | 2/1987 | Oura | ........................... 198/493 |
| 4,744,455 A | 5/1988 | Dragotta et al. | ............ 198/389 |
| 4,844,240 A | * 7/1989 | Hutter et al. | ................ 198/391 |
| 5,083,654 A | 1/1992 | Nakajima et al. | ........... 198/444 |
| 5,339,943 A | 8/1994 | Baird et al. | .................. 198/365 |
| 5,630,497 A | 5/1997 | Graham | ....................... 198/391 |
| 5,638,940 A | 6/1997 | Aoyama et al. | ............. 198/493 |
| 5,960,929 A | 10/1999 | Graham | ....................... 198/391 |
| 6,129,200 A | 10/2000 | Graham | ....................... 198/380 |
| 6,374,985 B1 | * 4/2002 | Nakashima et al. | ........ 198/391 |
| 6,607,067 B1 | * 8/2003 | Aoyama et al. | ............. 198/395 |

* cited by examiner

Primary Examiner—Joseph Valenza

(57) ABSTRACT

An inline feeder for delivering oriented parts, said inline feeder including a hopper section including a vibratory hopper for storing parts and transporting parts to an elevator section including an inclined elevator for receiving parts from said vibratory hopper and depositing said parts onto a linear feeder. Said inline feeder further including a part sensor for sensing flow of parts along said linear feeder, said sensor sensing flow and orientation of said parts on said linear feeder; and a an air fitting/valve for applying a burst of compressed gas against a part for rejecting and removing said part from said linear feeder, wherein said air valve operably in communication with said part sensor means for triggering a part rejection due to misorientation or jammed parts from said linear feeder and allowing properly oriented parts to be delivered.

17 Claims, 7 Drawing Sheets

INLINE FEEDER

This appl. claims benefit of U.S. Provisional Appl. 60/330,607, filed Oct. 25, 2001.

FIELD OF THE INVENTION

The present invention generally relates to the field of article feed mechanisms and sorters and more particularly to inline vibratory parts feeders.

BACKGROUND OF THE INVENTION

Vibratory parts feeders are commonly known apparati for providing oriented parts from a mass of disoriented parts or for transporting parts along a processing path. In providing oriented parts, vibratory parts feeders typically include a vibratory bowl which is driven by a vibratory drive unit. The bowl is intregally configured typically with a helicon oriented path to transport the parts under vibratory action to a bowl exit location near the top of the bowl.

There are a number of problems with this conventional technology including limitation to the parts per minute that can be delivered by vibratory bowl apparati, part jams which often need to be cleared manually by an operator and typically high operating and installation costs of vibratory bowl feeders.

PRIOR ART

A number of prior patents have been issued by the United States patent Office in regard to vibratory parts feeder, a good example of this is U.S. Pat. No. 5,630,497 by Graham patented May 20, 1997 entitled Vibratory Parts Feeder with Pivotal Top Confinement. This patent reviews the state of the art of vibratory bowl feeders and the problems encountered with them.

Due to the high capital cost required for the manufacture and purchase of vibratory bowl feeders, inherent jamming problems and requirement of constant supervision by an operator to clear jams as they occur and their low output or productivity despite the high cost of producing the machinery.

Therefore, this is a need for a new and improved method of providing oriented parts from a mass of disoriented parts which provides for a reliable low cost method for delivering oriented parts for subsequent operations.

SUMMARY OF THE INVENTION

The present invention an inline feeder for delivering oriented parts comprises:
  a) a means for storing and transporting and also a means for presenting parts onto a vibratory linear feeder;
  b) a means for sensing flow and orientation of said parts on said linear feeder; and
  c) a means for rejecting misoriented or jammed parts from said linear feeder and allowing properly oriented parts to be delivered.

Preferably wherein said rejecting means includes a tooling plate having a part profile allowing only substantially correctly oriented parts to pass there through.

Preferably wherein said sensing means includes a second part sensor for sensing flow of parts along said linear feeder, said flow sensor operable and communicating with said rejecting means such that when flow is not satisfactory parts are rejected.

Preferably wherein said rejected parts are returned to said storing and transporting means.

Preferably wherein said sensing means includes a third part sensor for sensing proximity of parts passing through said tooling plate operably communicating with said second flow sensor for monitoring flow of parts through said tooling plate and further communicating with said rejecting means such that when flow is not satisfactory parts are rejected Preferably wherein said sensing means includes a first part sensor for sensing the load of parts moving along said linear feeder, said first part sensor operatively communicating with said transporting means for increasing or decreasing part loading on said linear feeder as required to maintain a predetermined load.

Preferably wherein said second part sensor being disposed proximate a clearing station located just prior to parts entering the tooling plate. Preferably wherein the rejecting means includes an air fitting/valve for applying a burst of compressed gas against a part for removing said part from said linear feeder, wherein said air valve operably in communication with said sensing means for triggering a part rejection.

Preferably wherein said transporting means includes a hopper section including a vibratory hopper for storing parts and transporting parts to said presenting means.

Preferably wherein said presenting means includes an elevator section including an inclined elevator for receiving parts from said vibratory hopper and depositing said parts onto said linear feeder.

Preferably wherein said sensing means includes a first part sensor for sensing the load of parts moving along said linear feeder, said first part sensor operatively communicating with said inclined elevator for increasing or decreasing part loading on said linear feeder by increasing or decreasing the number of parts delivered by said inclined elevator.

Preferably wherein the vibratory hopper and the linear feeder, urge or transport parts in opposing directions.

Preferably wherein said inline feeder further includes a means for clearing jams in said tooling plate operably in communication with said sensing means for.

Preferably wherein said clearing means includes a pneumatic slide for opening said tooling plate for clearing jams.

Preferably wherein said tooling plate includes an upper plate position above and adjacent to a lower plate wherein said upper and lower plate define a part profile wherein said tooling plate can be opened by separating said upper plate from said lower plate.

The present invention is also a method of operating an inline feeder used for delivering oriented parts comprising the steps of:
  (a) storing parts in vibratory hopper;
  (b) delivering said parts to an inclined elevator;
  (c) elevating and delivering said parts to a linear feeder;
  (d) sensing excessive part load on linear feeder;
  (e) reducing part loading by reducing elevator stroke or frequency; and
  (f) feeding parts through an intelligent tooling plate which allows only substantially correctly oriented parts to pass there through Preferably a method of operating an inline feeder used for delivering oriented parts comprising the steps of:
  (a) storing parts in a hopper;
  (b) delivering said parts to an elevator;
  (c) elevating and delivering said parts to a linear feeder;
  (d) sensing and clearing misoriented or jammed parts from a linear feeder prior to entering tooling plate;
  (e) feeding said parts through an intelligent tooling plate.

Preferably a method of operating an inline feeder used for delivering oriented parts comprising the steps of:

(a) storing parts in a hopper;

(b) delivering said parts to an elevator;

(c) elevating and delivering said parts to a linear feeder;

(d) sensing excessive part load on linear feeder;

(e) reducing part load by reducing elevator stroke or frequency;

(f) sensing misoriented parts at clearing station;

(g) clearing misoriented or jammed parts using compressed air from linear feeder at clearing station;

(h) feeding correctly oriented parts through an intelligent tooling plate.

DETAILED DESCRIPTION OF THE PREFERRED EMBODIMENT

The present invention an Inline Feeder shown generally as 30 is comprised of the following major components, namely hopper section shown generally as 31, elevator section shown generally as 35 and inline vibratory feeder section shown generally as 33. These sections are all mounted onto base 50 as shown.

Hopper Section

Figure 1:
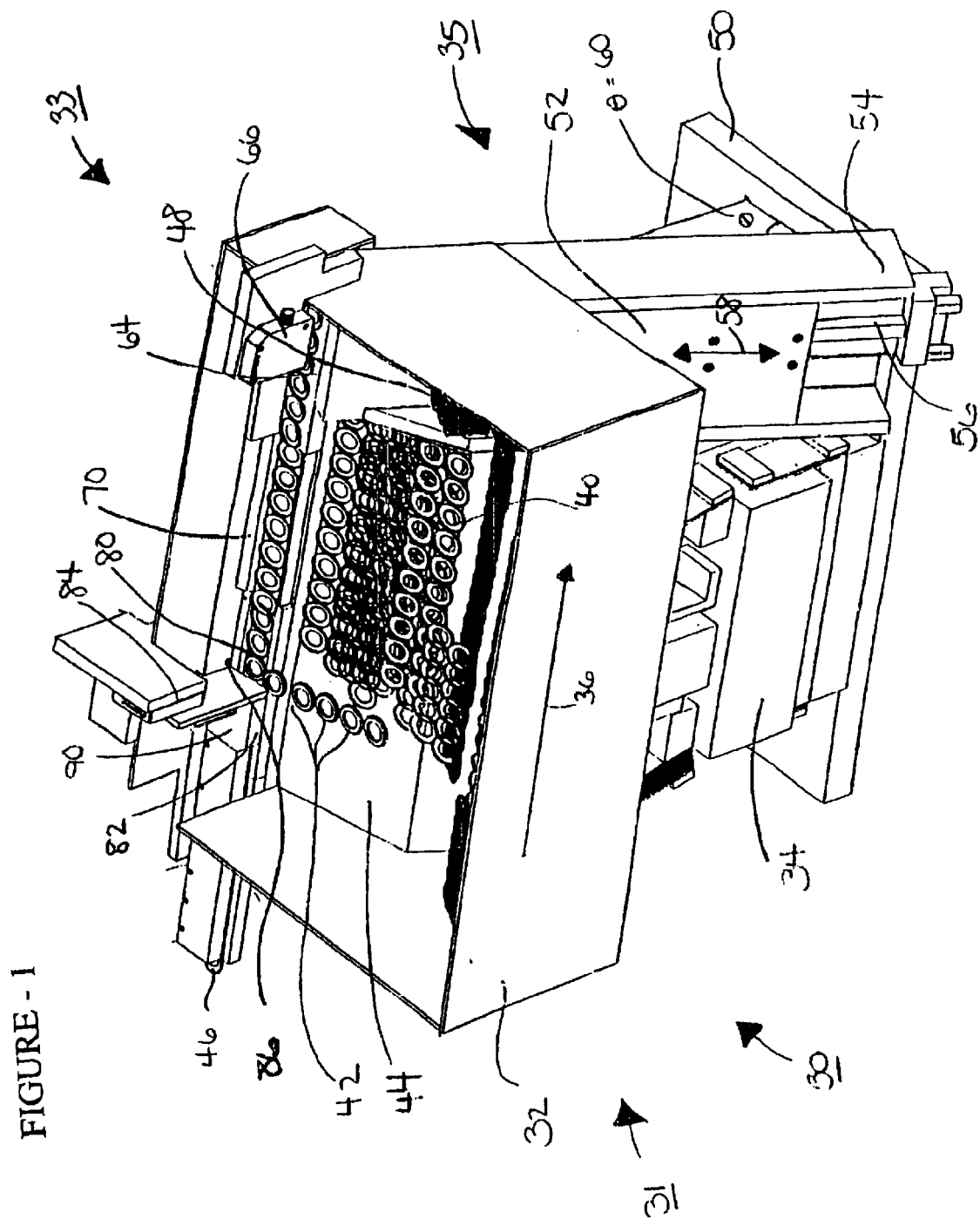
FIG. 1 is a schematic front perspective view of the current invention an Inline Feeder.
Figure 2:
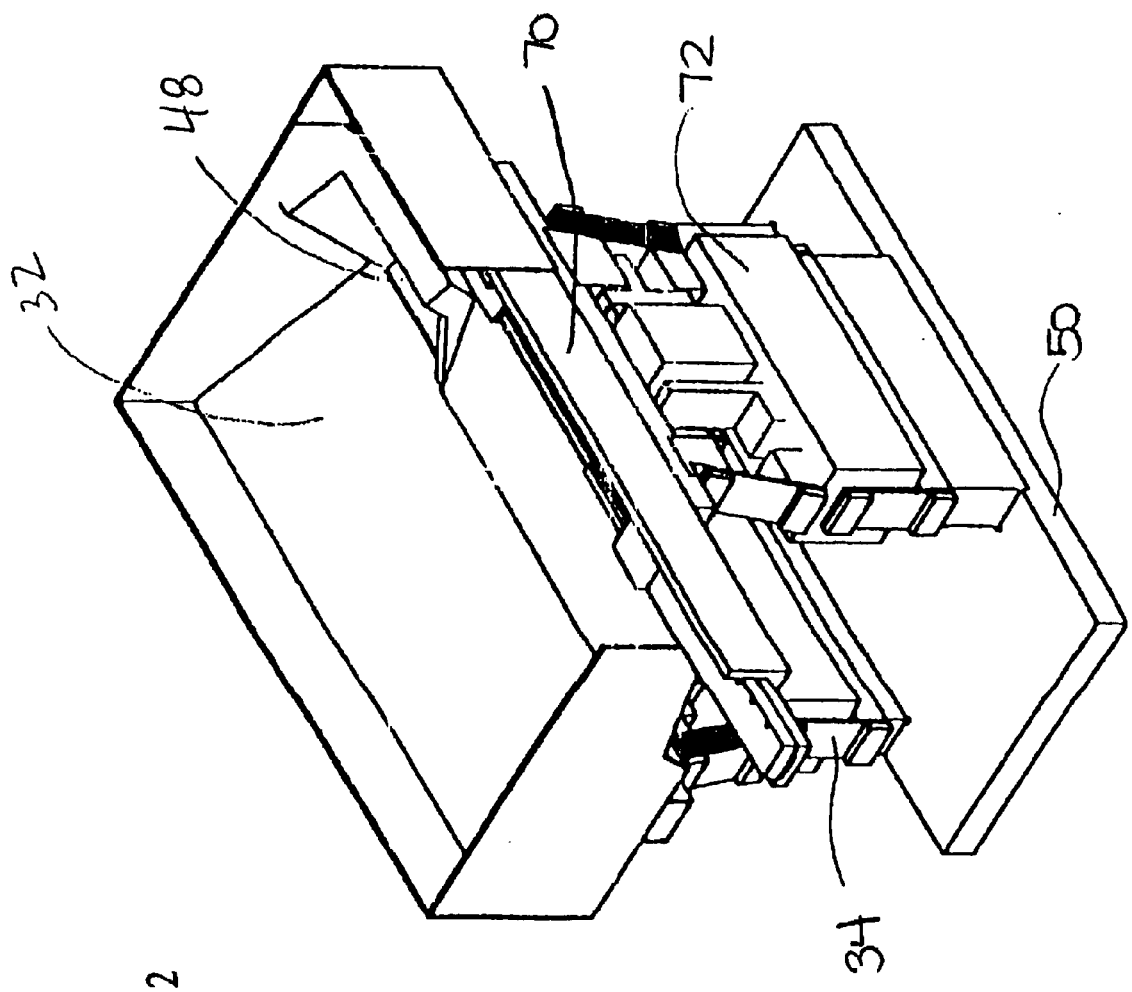
FIG. 2 is a schematic back perspective view of the current invention the Inline Feeder.

Hopper section shown generally as 31 includes a vibratory hopper 32 which is a rectangularly box shaped receptacle for receiving parts 40 therein. Vibratory hopper 32 is mounted onto a hopper vibratory drive 34 which in turn is mounted onto base 50. Hopper vibratory drive 34 is the type known in the industry which operates at a frequency of approximately 3,600 (three thousand, six hundred) vibrations per minute and vibratory hopper 32 is arranged in such a manner that parts 40 flow normally in direction 36 as shown in FIG. 1. Vibratory hopper 32 is charged with parts 40 via traditional charging methods and also receives rejected parts 42 which slide down ramp 44. Parts 40 make their way to elevator accumulator 48 waiting to be moved by elevator section shown generally as 35.

Elevator Section

Elevator Section 35 includes an inclined elevator which has a more or less rectangular cross section and is mounted slidably onto elevator guides 54 which are mounted on an inclined angle 60 relative to base 50. Elevator pneumatic piston 56 operates functionally to move inclined pneumatic slide elevator 52 upwardly and downwardly in elevator direction shown as 58. Parts 40 in elevator accumulator 48 are raised by inclined pneumatic slide elevator 52 moving in an upward direction 58 until parts 40 slide off of the top surface of inclined pneumatic slide elevator 52 and onto part receiving platform 64. The stroke of incline pneumatic slide elevator 52 can be functionally controlled by first part sensor 66 which determines the load of parts 40 on linear feeder 70. When first part sensor 66 detects a shortage of parts on linear feeder 70 as well on part receiving platform 64, the stroke or frequency of incline pneumatic slide elevator 52 is increased to discharge more parts onto part receiving platform 64. Conversely if too many parts are detected on part receiving platform 64 and linear feeder 70, the stroke or frequency of incline pneumatic slide elevator 52 is decreased thereby depositing fewer parts onto part receiving platform 64. Fist part sensor is preferably a background suppression type sensor available from Baumer Inc.

Parts 40 are continually being vibratorily fed by vibratory hopper 32 onto elevator accumulator portion 48 such that parts 40 are continuously available at elevator accumulator 48 for transport of parts 40 to part receiving platform 64. First part sensor 66 control the stroke or frequency of incline pneumatic slide elevator 52 thereby controlling the number of parts on part receiving platform 64 and linear feeder 70.

Inline Vibratory Feeder Section

Inline vibratory feeder section shown generally as 33 is comprised of a linear feeder 70 which is mounted onto an inline feeder vibratory drive 72 which in turn is mounted onto a base 50. Inline feeder vibratory drive 72 is the type generally known in the industry which operate at approximately 3,600 (three thousand six hundred) vibrations per minute. These type of inline vibratory drives allow one to adjust the speed of parts moving along the inline feeder by for example adjusting the amplitude of the inline feeder. Parts 40 moving along linear feeder 70 come to clearing station 80 just prior to entering tooling plate 82. At clearing station 80, a second part sensor 84 senses the flow of parts at the clearing station including the dwell time of a part at the clearing station. Second part sensor 84 preferably is a flow sensor mounted adjacent or just above clearing station 80. Flow sensor 84 can be of the background suppression type currently available through Baumer Inc., or any other sensor that may be suitable. Depending upon whether there is jam at clearing station 80 or there are too many parts, or parts are not travelling through the tooling plate 82, second part sensor 84 may trigger air fitting/valve 86 which rejects parts and clears them from clearing station 80. Rejected parts 42 under air pressure are pushed down ramp 44 and into vibratory hopper 32 to once again be fed through the cycle. Parts 40 oriented the right way will enter through tooling plate 82. Only correctly oriented parts enter tooling plate 82 successfully. Should a part be misoriented or should double parts be present or should there be jams or misorientations of any kind, tooling plate 82 will not allow the parts to pass there through. In addition, a third part sensor behind tooling plate 82 determines the time a part 40 has taken to travel from clearing station 80 to third part sensor 90. When a preset dwell time is exceeded, tooling plate 82 is completely opened up by a pneumatic cylinder thereby clearing any jams within tooling plate 82. Parts that are correctly oriented and move through tooling plate 82 in a predetermined amount of time are discharged at part discharge 46 and moved onto subsequent assembly operations not included in this patent.

Tooling Plate

Figure 3:
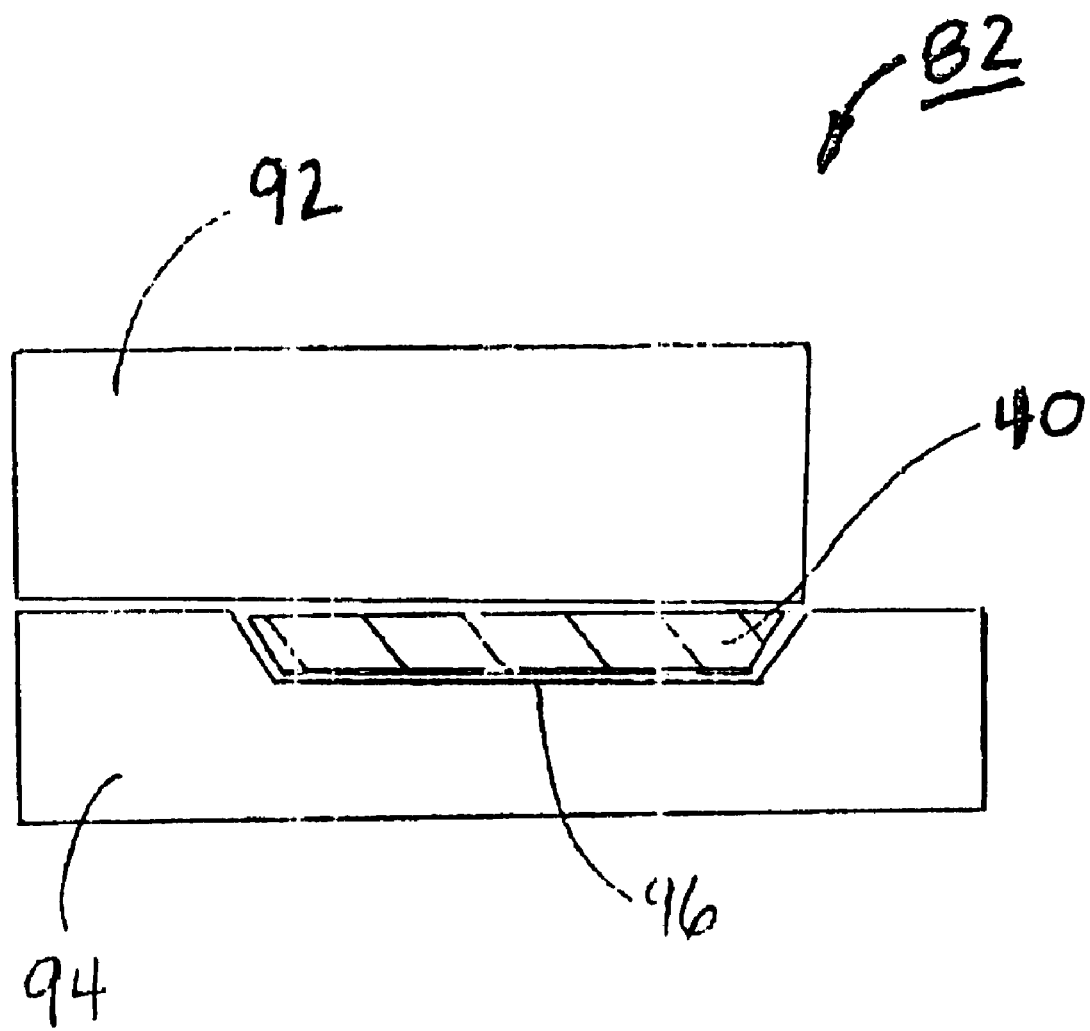
FIG. 3 is a schematic cross-sectional view of the tooling plate of the Inline Feeder.
Figure 4:
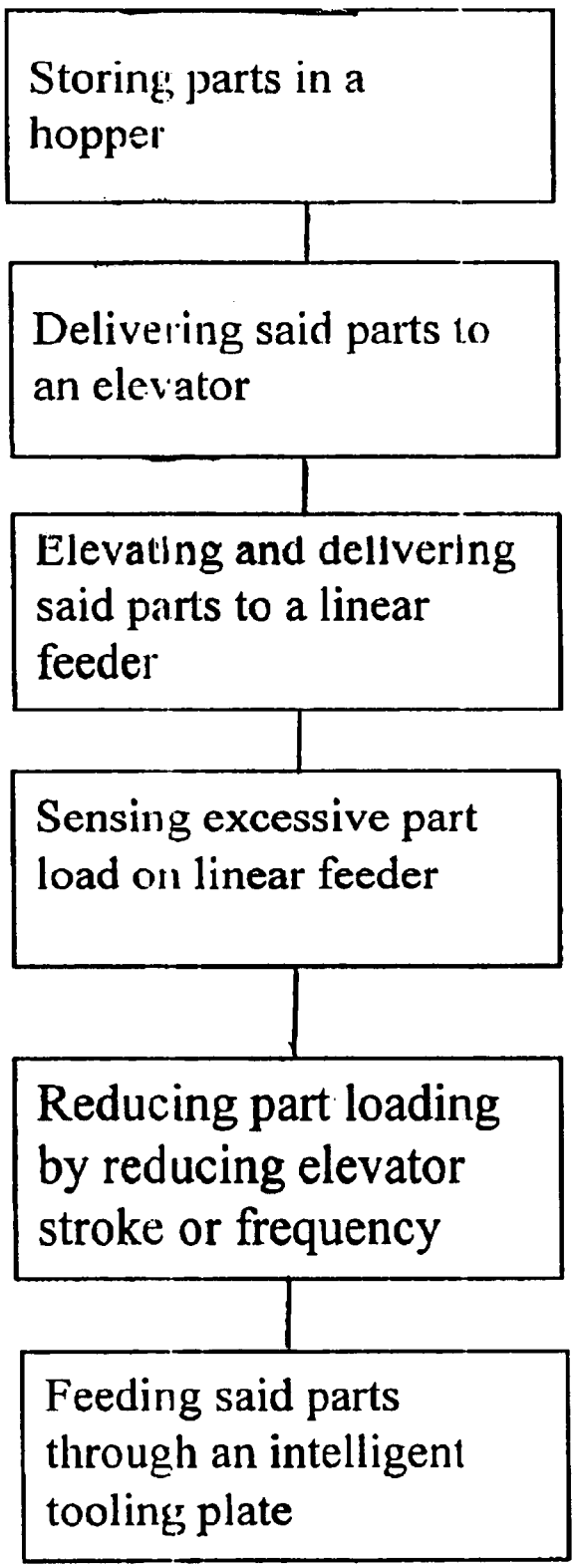
FIG. 4 is a flow diagram showing the method of operating the Inline Feeder.
Figure 5:
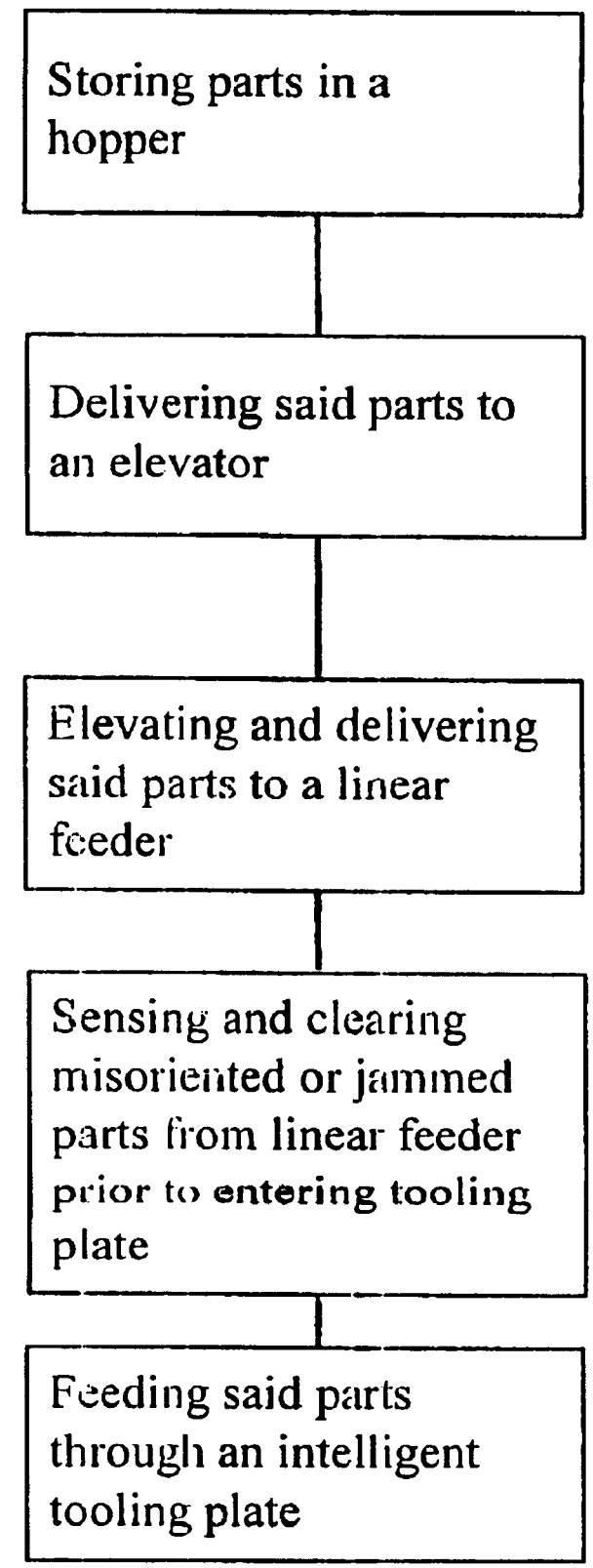
FIG. 5 is a flow diagram showing the method of operating the Inline Feeder.
Figure 6:
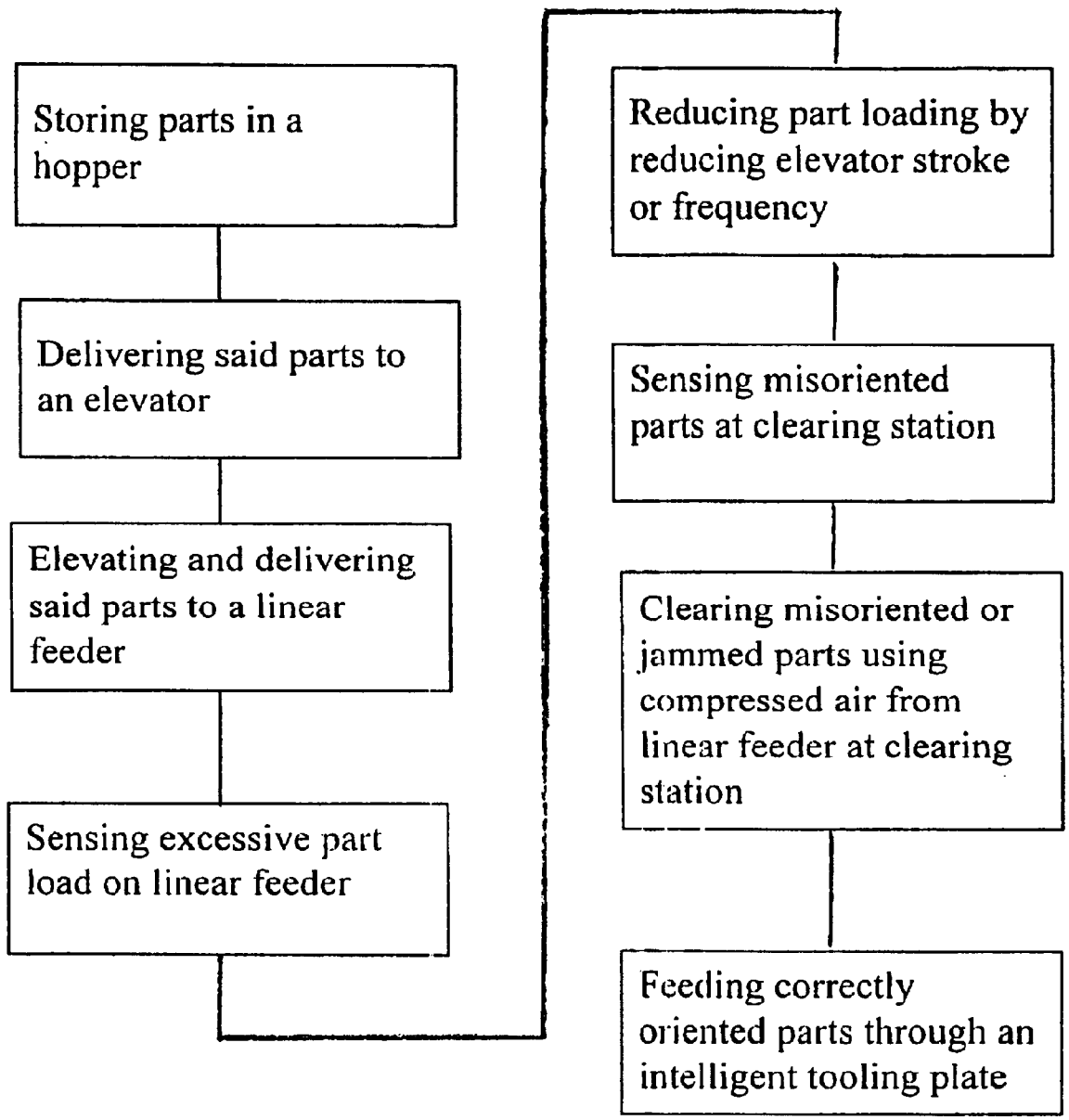
FIG. 6 is a flow diagram showing the method of operation of the Inline Feeder.
Figure 7:
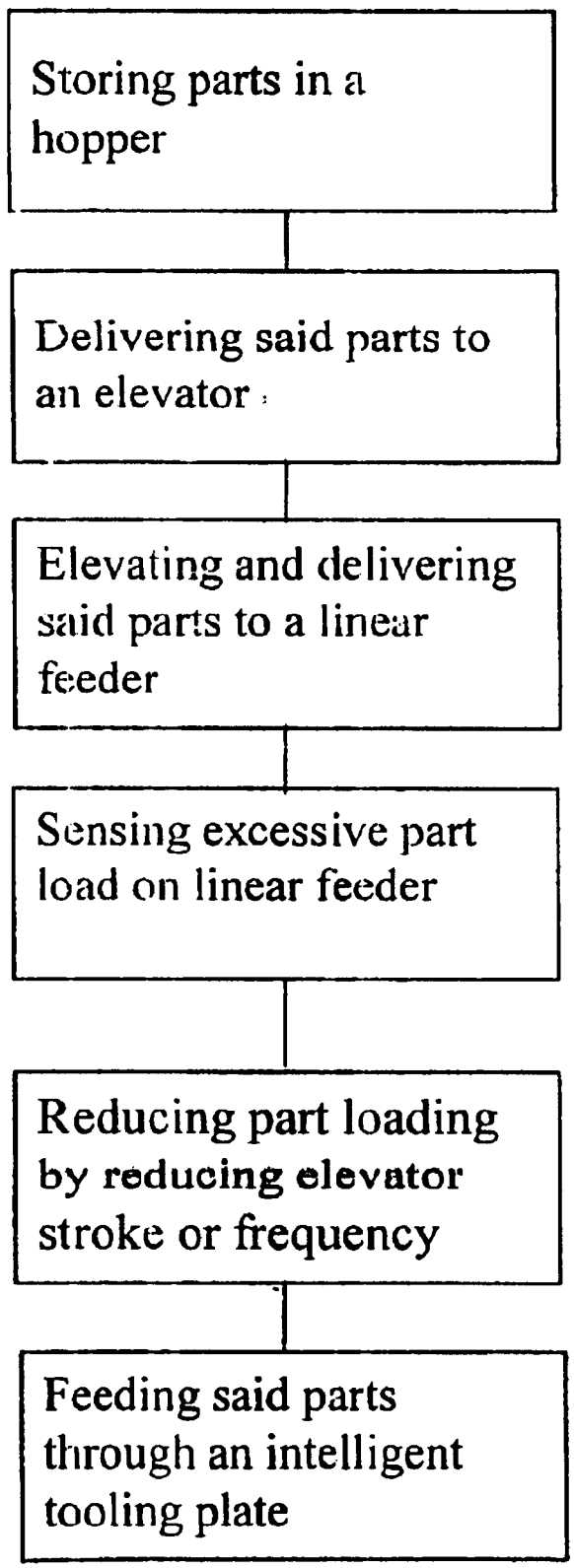
FIG. 7 is a flow diagram showing the method of operating the Inline Feeder.

Referring now to FIG. 3 showing generally in cross sectional view a tooling plate as 82. Tooling plate 82 includes upper plate 92, lower plate 94, a part profile 96 and a part 40 passing there through. By way of example only the part shown is coined shaped having bevelled edges. Therefore should the part lay on one side, the bevelled edges will conform to the part profile 96 and the part will pass through tooling plate 82. On the other hand, if part 40 is reversely oriented (upside down), the bevelled edges will not register with part profile 96 thereby preventing parts 40 from passing through tooling plate 82. In this manner misoriented parts are prevented from passing through tooling plate 82. Only parts which pass through tooling plate 82 eventually become usable parts and are discharged at part discharge 46 and on the further assembly operations. Upper plate 92 can be pivotally moved away from lower plate 94 through pneumatic cylinders not shown. Pivoting upper plate 92 or opening tooling plate 82 may be necessary to clear jams. It is understood that part profile 96 is just one example of a myriad of part shapes that can be accommodated.

In addition to second part sensor 84 a third part sensor 90 which preferably is a proximity sensor is mounted adjacent or just above tooling plate 82. Preferably third part sensor 90 sees through an aperture (not shown) in upper plate 92 in order to "see" or sense parts travelling through tooling plate 82. Second part sensor 84 and third part sensor 90 communicate logically with each other to determine if any jam condition exists. In addition should a jam occur within tooling plate 82 itself for example if two parts are nested together and manage to enter into tooling plate 82 then second part sensor 84 together with third part sensor 90 will recognize this condition and open up tooling plate 82 by lifting off upper plate 92 from lower plate 94. The second part sensor 84 together with the third part sensor 90 provide an intelligent clearing system which automatically clears almost all jams that could occur.

In Use

In use inline feeder 30 operates as follows:

Vibratory hopper 32 is charged with parts 40, either from an external source not shown by means conventionally such as chutes, part hoppers, conveyor belts etc. Vibratory hopper 32 also receives parts that have been rejected from the linear feeder 70 section thereby finding there way back into vibratory hopper 32. Vibratory hopper 32 is mounted onto hopper vibratory drive 34 which in turn is mounted to base 50. Vibratory hopper 32 via vibratory drive 34 urges parts 40 along direction 36 until elevator accumulator 48 is filled with parts 40. The size and shape of vibratory hopper 32 is can be altered to accommodate parts of different sizes and shapes. Normally speaking the larger the parts the larger the hopper required and in turn the entire unit would be scaled larger to accommodate a larger part. Parts 40 shown in the drawings are by way of example only. Parts 40 shown are a coined shaped part being relatively flat and having bevelled and/or chamfered ends.

Once parts 40 are delivered to elevator accumulator 48, incline pneumatic slide elevator 52 is moved upwardly shown as direction 58 along elevator guides 54 thereby elevating parts up to part receiving platform 64. Once inclined pneumatic slide elevator 52 has reached a high enough position, parts 40 will slide and/or tumble onto part receiving platform 64 under gravity. A first part sensor 66 senses the load on part receiving platform as well as linear feeder 70 and controls the frequency as well as the stroke of the inclined pneumatic slide elevator 52. Inclined pneumatic slide elevator 52 is preferably operated by an elevator pneumatic piston 56 and is inclined at an angle of around 60 degrees shown as angle theta 60 in the diagram. When first part sensor 66 determines that more parts are required, it sends a single to increase the stroke or increase the frequency of inclined pneumatic slide elevator 52 such that more parts are delivered onto part receiving platform 64. Should fewer parts be required such as when first part sensor 66 determines an overload of part receiving platform 64 the stroke and/or the frequency of inclined pneumatic slide elevator 52 is reduced thereby delivering fewer parts to part receiving platform 64. Linear feeder 70 is mounted onto a separate inline feeder vibratory drive 72 which is mounted onto base 50. Inline feeder vibratory drive 72 moves parts 40 along inline feeder in a linear fashion until they arrive at clearing station 80. At clearing station 80, second part sensor 84 determines the dwell time of part 40 at clearing station 80, and also determines whether or not there is a build up or a jam of parts at clearing station 80. Should parts 40 not be moving past clearing station 80 at a predetermined pass time, second parts sensor 84 will send a signal to air fitting/valve 86 thereby forcibly with air pressure rejecting parts 42 which are fed down ramp 44 and back into vibratory hopper 32. Parts 40 which are properly oriented enter tooling plate 82 and are monitored by a third part sensor 90 which is logically interfaced with second parts sensor 84 to determine the rate at which parts move from clearing station 80 through tooling plate 82.

By way of example only, if parts 40 are not passing through tooling plate 82 at a fast enough rate as measured by second part sensor 84 and third part sensor 90, a signal is sent to open up tooling plate 82 which is done by a pneumatic slide not shown wherein upper plate 92 is pivoted away from lower plate 94 thereby clearing parts 40 out of tooling plate 82.

Those skilled in the art will see that the linear feeder 70 section is totally automated and intelligent in that part loading is monitored, misoriented parts and/or jams are automatically cleared at clearing station 80, and should some parts become jammed within tooling plate 82 itself, a third sensor is in place to detect that condition and clearing of tooling plate 82 will automatically take place normally by pivoting open upper plate 92 from lower plate 94.

Correctly oriented parts arriving at clearing station 80 move easily and quickly through tooling plate 82 and outward through part discharge 46 where correctly oriented parts are then subsequently fed to other assembly operations.

A minimal amount of operator assistance is required with this set up in that, first part sensor 66, second part sensor 84 and third part sensor 90 provide an intelligent clearing system which is able to detect almost all jams or misorientation of parts and automatically clear these misorientations and/or jams without operator interference.

Method of Operation

The inline feeder apparatus shown generally as 30 operates as follows:

(a) storing parts in hopper 32; delivering said parts to an elevator 52;

elevating and delivering said parts to a linear feeder 70;

sensing excessive part load on linear feeder;

reducing part loading by reducing elevator 52 stroke or frequency;

feeding parts through an intelligent tooling plate having second part sensor 84 and third part sensor 90.

Alternate Method of Operation (b) storing parts in a hopper;

delivering said parts to an elevator;

elevating and delivering said parts to a linear feeder;

sensing and clearing misoriented or jammed parts from a linear feeder prior to entering tooling plate;

feeding said parts through an intelligent tooling plate.

An Alternate Method of Operating Inline Feeder (c) storing parts in a hopper;

delivering said parts to an elevator;

elevating and delivering said parts to a linear feeder;

sensing excessive part load on linear feeder;

reducing part load by reducing elevator stroke or frequency;

sensing misoriented parts at clearing station;

clearing misoriented or jammed parts using compressed air from linear feeder at clearing station;

feeding correctly oriented parts through an intelligent tooling plate.

An Alternate Method of Operating Inline Feeder (d) storing parts in the hopper;

delivering said parts to an elevator;

elevating and delivering said parts to a linear feeder;

clearing misoriented or jammed parts from linear feeder;

feeding said parts to intelligent tooling plate;

sensing through put and jams through said tooling plate;

clearing tooling plate of jams.

Additionally the above described inline feeder provides a counter flow or opposing flow of parts namely parts flow in direction 36 along vibratory hopper 32 and flow in the opposite direction along linear feeder 70.

It should be apparent to persons skilled in the arts that various modifications and adaptation of this structure described above are possible without departure from the spirit of the invention the scope of which defined in the appended claim.

What is claimed is:

1. An inline feeder for delivering oriented parts, said inline feeder comprising:
    a) a means for storing and transporting and also a means for presenting parts onto a vibratory linear feeder;
    b) a means for sensing flow and orientation of said parts on said linear feeder; and
    c) a means for rejecting misoriented or jammed parts from said linear feeder and allowing properly oriented parts to be delivered; and
    d) wherein said rejecting means includes a tooling plate having a part profile allowing only substantially correctly oriented parts to pass there through.

2. The inline feeder claimed in claim 1, wherein said sensing means includes a second part sensor for sensing flow of parts along said linear feeder, said flow sensor operable and communicating with said rejecting means such that when flow is hot satisfactory parts are rejected.

3. The inline feeder claimed in claim 2, wherein said rejected parts are returned to said storing and transporting means.

4. The inline feeder claimed in claim 2, wherein said sensing means includes a third part sensor for sensing proximity of parts passing through said tooling plate operably communicating with said second flow sensor for monitoring flow of parts through said tooling plate and further communicating with said rejecting means such that when flow is not satisfactory parts are rejected.

5. The inline feeder claimed in claim 2 wherein said sensing means includes a first part sensor for sensing the load of parts moving along said linear feeder, said first part sensor operatively communicating with said transporting means for increasing or decreasing part loading on said linear feeder as required to maintain a predetermined load.

6. The inline feeder claimed in claim 2, wherein said second part sensor being disposed proximate a clearing station located just prior to parts entering the tooling plate.

7. The inline feeder claimed in claim 1 wherein the rejecting means includes an air fitting/valve for applying a burst of compressed gas against a part for removing said part from said linear feeder, wherein said air valve operably in communication with said sensing means for triggering a part rejection.

8. The inline feeder claimed in claim 1, wherein said transporting means includes a hopper section including a vibratory hopper for storing parts and transporting parts to said presenting means.

9. The inline feeder claimed in claim 7, wherein said presenting means includes an elevator section including an inclined elevator for receiving parts from said vibratory hopper and depositing said parts onto said linear feeder.

10. The inline feeder claimed in claim 8 wherein said sensing means includes a first part sensor for sensing the load of parts moving along said linear feeder, said first part sensor operatively communicating with said inclined elevator for increasing or decreasing part loading on said linear feeder by increasing or decreasing the number of parts delivered by said inclined elevator.

11. The inline feeder claimed in claim 7, wherein the vibratory hopper and the linear feeder, urge or transport parts in opposing directions.

12. The inline feeder claimed in claim 1, wherein said inline feeder further includes a means for clearing jams in said tooling plate operably in communication with said sensing means for.

13. The inline feeder claimed in claim 12, wherein said clearing means includes a pneumatic slide for opening said tooling plate for clearing jams.

14. The inline feeder claimed in claim 13, wherein said tooling plate includes an upper plate position above and adjacent to a lower plate wherein said upper and lower plate define a part profile wherein said tooling plate can be opened by separating said upper plate from said lower plate.

15. A method of operating an inline feeder used for delivering oriented parts comprising the steps of:
    a) storing parts in vibratory hopper;
    b) delivering said parts to an inclined elevator;
    c) elevating and delivering said parts to a linear feeder;
    d) sensing excessive part load on linear feeder;
    e) reducing part loading by reducing elevator stroke or frequency; and
    f) feeding parts through an intelligent tooling plate which allows only substantially correctly oriented parts to pass there through.

16. A method of operating an inline feeder used for delivering oriented parts comprising the steps of:
    a) storing parts in a hopper;
    b) delivering said parts to no elevator;
    c) elevating and delivering said parts to a linear feeder;
    d) sensing and clearing misoriented or jammed parts from a linear feeder prior to entering tooling plate;
    e) feeding said parts through an intelligent tooling plate.

17. A method of operating an inline feeder used for delivering oriented ports comprising the steps of:
    a) storing parts in a hopper;
    b) delivering said parts to an elevator;
    c) elevating and delivering said parts to a linear feeder;
    d) sensing excessive part load on linear feeder,
    e) reducing part load by reducing elevator stroke or frequency;
    f) sensing misoriented parts at clearing station;
    g) clearing misoriented or jammed parts using compressed air from linear feeder at clearing station;
    h) feeding correctly oriented parts through an intelligent tooling plate.

* * * * *